Sept. 25, 1923.  
A. M. PORTER  
1,468,743  
NOVELTY CANDY PACKAGE  
Filed July 20, 1921
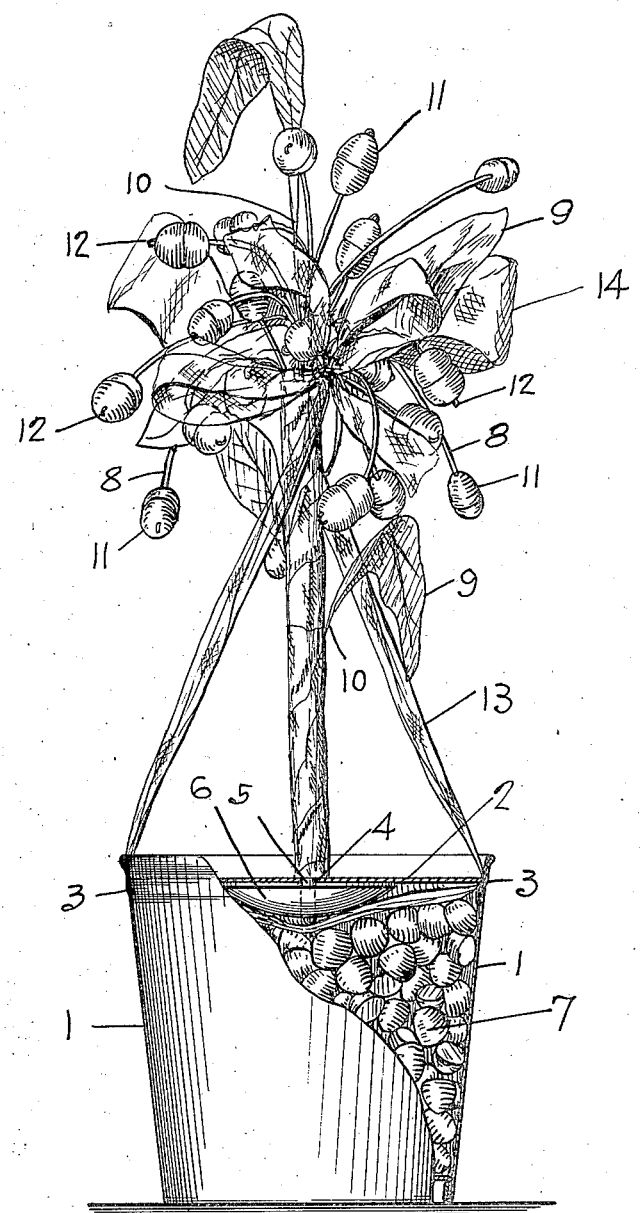
Inventor  
Adelaide M. Porter  
By her Attorney  
Wm Wallace White Patented Sept. 25, 1923.

1,468,743

UNITED STATES PATENT OFFICE.

ADELAIDE M. PORTER, OF GREENWICH, CONNECTICUT, ASSIGNOR TO HUYLER'S, OF NEW YORK, N. Y., A CORPORATION OF NEW YORK.

NOVELTY CANDY PACKAGE.

Application filed July 20, 1921. Serial No. 486,234.

*To all whom it may concern:*

Be it known that I, ADELAIDE M. PORTER, a citizen of the United States of America, residing at Greenwich, Connecticut, have invented new and useful Improvements in Novelty Candy Packages, of which the following is a specification.

My invention relates to and has as an object a novelty candy package in the form of a plant growing in a flower pot, in which certain of the candies are used for decorative purposes in forming part of the plant, and the bulk of the candy may be packed in the flower pot itself, the whole forming a device which may be preserved as an ornament for a period of time, but ultimately, as the candy is consumed, is destroyed. Further objects of the invention relate to details of construction by which the artificial plant is maintained upright; by which certain of the candies are supported to represent blossoms upon the plant; and by which access to the flower pot is obtained.

My invention consists in the construction, combination and arrangement of parts herein described and claimed, and illustrated in the accompanying drawings.

In these drawings, the figure shows a flower pot filled with candy and having an artificial plant growing therefrom, the flower-pot being shown partly in approximately central vertical section.

Referring to these drawings, the flower-pot 1 may be of any desired form, but preferably is provided with an annular groove 3 adapted to receive a cover 2, these parts being made preferably of pasteboard, so that the cover 2 when sprung into place in the annular groove 3 is held there firmly enough to support the artificial plant. The artificial plant comprises a stem or trunk 5 which extends through an opening 4 in the cover 2, engaging a button 6 immediately beneath the cover 2, frictional contact between the trunk 5 and the cover 2 serving to hold the plant in place, and the button 6 being firmly held against the cover 2 by the contents 7 of the flower-pot, the contents being preferably a quantity of small candies.

The plant is provided with a plurality of artificial leaves 9 mounted upon wire stems 10 which are wound around the stem 5 to support the leaves; and additional wire stems 8 are provided to support the blossoms 11 of the plant which comprise small candies preferably of the gum-drop variety, usually hemispherical in shape, and placed upon the wires, two to form each blossom, with their flat bottoms adjacent so as to make a substantially spherical blossom, these candy blossoms, being adapted to be pierced by the wire stems 8 so as to support them, the tip 12 of the stem 8 being bent approximately at right-angles to the stem to retain the blossom in place. The trunk 5 about which the wires 8 and 10 are wound, and which supports these wires, may then be wound with green paper or the like to conceal the wires, and give the effect of a trunk of a plant.

The plant is further decorated by the use of a ribbon 13 which passes under the lid 2 of the flower-pot, and extending upward from diametrically opposite sides of the lid is tied to the stem 5 at the upper part thereof, with a fancy bow 14. After the plant has been assembled, and the ribbon tied in place, and the pot 1 filled with its candy contents 7, the lid is pressed firmly in place engaging the groove 3. When access to the candy is desired, the lid 2 may be removed readily by pulling upward upon one or other of the upwardly extending strands of ribbon, thus raising an edge of the lid 2 from the groove 3, and enabling the lid to be removed without damaging it in any way. The blossoms may of course be picked and eaten as desired.

Having now described my invention, I claim and desire to secure by Letters Patent:

1. A novelty candy package comprising a representation of a flower pot, an artificial plant set in said pot, said plant having wire stems for the blossoms, and candies pierced by and mounted upon said stems to represent the blossoms.

2. A novelty candy package comprising a representation of a flower pot adapted to contain a quantity of candy, a cover for said pot, an artificial plant set in the cover of said pot, said plant having wire stems for the blossoms, and candies pierced by and mounted upon said stems to represent the blossoms.

3. A novelty candy package comprising a representation of a flower pot adapted to contain a quantity of candy, said pot having an annular groove near the top, a cover adapted to fit said annular groove and be held in place thereby, a representation of a trunk secured to said cover, artificial leaves mounted on said trunk, wire stems mounted on said trunk, and candies pierced by and mounted upon said stems to represent blossoms.

4. A novelty candy package comprising a representation of a flower pot adapted to contain a quantity of candy, a cover for said pot, an artificial plant mounted on said cover, and a ribbon passed under said cover having a bow tied to the upper part of the plant.

5. A novelty candy package comprising a representation of a flower pot adapted to contain a quantity of candy, said pot having an annular groove near the top, a cover adapted to fit said annular groove and be held in place thereby, a representation of a trunk passing through said cover, a button secured to said trunk beneath said cover at the lower end of the trunk, and a ribbon passed under said cover and button and having a bow tied to the upper part of the trunk, said ribbon serving to support said trunk in position upon the cover, and for opening the package.

In testimony whereof I have signed my name to this specification.

ADELAIDE M. PORTER.